(12) United States Patent
Owens et al.

(10) Patent No.: US 6,957,961 B1
(45) Date of Patent: Oct. 25, 2005

(54) MANIKIN HAVING A BIO-SIMULATING MATERIAL AND A METHOD OF MAKING THE SAME

(75) Inventors: John E. Owens, Oak Lawn, IL (US); Scott M. Milkovich, Glen Ellyn, IL (US); Daniel K. Stool, Addison, IL (US)

(73) Assignee: Ram Consulting, Inc., Oakbrook, IL (US)

( * ) Notice: Subject to any disclaimer, the term of this patent is extended or adjusted under 35 U.S.C. 154(b) by 95 days.

(21) Appl. No.: 10/368,355

(22) Filed: Feb. 20, 2003

Related U.S. Application Data

(63) Continuation-in-part of application No. 10/014,534, filed on Dec. 14, 2001, now abandoned.
(60) Provisional application No. 60/255,397, filed on Dec. 15, 2000, and provisional application No. 60/255,430, filed on Dec. 15, 2000.

(51) Int. Cl.$^7$ .............................................. G09B 23/28
(52) U.S. Cl. ...................................... 434/270; 434/267
(58) Field of Search ................................ 434/262, 265, 434/267, 270, 274; 446/295, 296, 304, 321, 337, 376, 379, 380, 390

(56) References Cited

U.S. PATENT DOCUMENTS

| | | | |
|---|---|---|---|
| 1,384,731 A | 7/1921 | Richards | 434/267 |
| 3,557,471 A | 1/1971 | Payne et al. | 434/270 |
| 3,757,431 A | 9/1973 | Daniel | 35/17 |
| 3,822,486 A * | 7/1974 | Knapp et al. | 434/273 |
| 3,841,163 A | 10/1974 | Daniel | 73/432 |
| 4,161,874 A | 7/1979 | Specker et al. | 73/12 |
| 4,235,025 A | 11/1980 | Kortge | 35/17 |
| 4,261,113 A | 4/1981 | Alderson | 434/274 |
| 4,276,032 A | 6/1981 | Woley et al. | 434/274 |
| 4,349,339 A | 9/1982 | Daniel | 434/274 |
| 4,409,835 A | 10/1983 | Daniel et al. | 434/274 |
| 4,481,001 A * | 11/1984 | Graham et al. | 434/267 |
| 4,488,433 A | 12/1984 | Denton et al. | 434/274 |
| 4,691,556 A | 9/1987 | Mellander et al. | 73/12 |
| 4,701,132 A | 10/1987 | Groesch et al. | 434/274 |
| 4,708,836 A * | 11/1987 | Gain et al. | 264/40.1 |
| 4,873,867 A | 10/1989 | McPherson et al. | 73/493 |
| 5,018,977 A | 5/1991 | Wiley et al. | 434/274 |
| 5,221,937 A * | 6/1993 | Machtig | 353/28 |
| 5,259,765 A | 11/1993 | Richards | 434/274 |
| 5,317,931 A | 6/1994 | Kalami | 33/760 |
| 5,409,382 A | 4/1995 | Donnelly et al. | 434/262 |

(Continued)

FOREIGN PATENT DOCUMENTS

GB          2191884 A        12/1987

*Primary Examiner*—Kurt Fernstrom
(74) *Attorney, Agent, or Firm*—McGuireWoods LLP

(57) ABSTRACT

A manikin system is provided for testing product safety, and a method of making the manikin system is also provided. The manikin system includes a trunk portion and a plurality of body portions. The plurality of body portions includes a neck portion detachably connected to the trunk portion, a pair of arm portions detachably connected to the trunk portion, a hand portion detachably connected to each arm portion, a pair of leg portions detachably connected to the trunk portion, and a foot portion detachably connected to each leg portion. The body portions and trunk portion are formed of a bio-simulating material. Each of the body portions has selected characteristics and is removable and replaceable with another body portion having different characteristics. The manikin may provide accurate measurement of physical effects of hazardous conditions on a child and flexible and offer flexibility to change manikin test fixtures easily. The manikin may also accurately simulate the size, weight, a range of possible movement, and other physical characteristics of real children.

10 Claims, 15 Drawing Sheets

U.S. PATENT DOCUMENTS

| | | | |
|---|---|---|---|
| 5,526,707 A | 6/1996 | Smrcka | 73/866.4 |
| 5,528,943 A | 6/1996 | Smrcka et al. | 73/866.4 |
| 5,628,633 A * | 5/1997 | Lehman | 434/265 |
| 5,741,989 A | 4/1998 | Viano et al. | 73/866.4 |
| 5,803,746 A * | 9/1998 | Barrie et al. | 434/267 |
| 5,941,710 A * | 8/1999 | Lampotang et al. | 434/272 |
| 6,009,750 A | 1/2000 | Maurer et al. | 73/172 |
| 6,050,826 A * | 4/2000 | Christianson et al. | 434/262 |
| 6,077,083 A * | 6/2000 | Smith-Whitley et al. | 434/262 |
| 6,155,960 A | 12/2000 | Roberts et al. | 482/83 |
| 6,230,574 B1 | 5/2001 | Rider et al. | 73/865.1 |
| 6,238,215 B1 * | 5/2001 | Jurmain et al. | 434/270 |
| 6,325,454 B1 | 12/2001 | Maier | 297/253 |
| 6,328,625 B1 | 12/2001 | Lee et al. | 446/376 |
| 6,361,729 B1 * | 3/2002 | Strover et al. | 264/247 |
| 6,409,516 B1 * | 6/2002 | Thill | 434/274 |

* cited by examiner

MANIKIN HAVING A BIO-SIMULATING MATERIAL AND A METHOD OF MAKING THE SAME

CROSS REFERENCE TO RELATED APPLICATION

This patent application is a continuation-in-part application that claims the benefit under 35 U.S.C. § 120 of the filing date of U.S. patent application Ser. No. 10/014,534 filed on Dec. 14, 2001 now abandoned, which in turn claims the benefit of the filing date of U.S. Provisional Application Nos. 60/255,397 and 60/255,430, each filed on Dec. 15, 2000, the complete disclosure of which is incorporated herein by reference.

DESCRIPTION OF THE INVENTION

1. Field of the Invention

The present invention relates to an apparatus for monitoring results of trauma or injury to a human body and a method of making such an apparatus. More particularly, the invention is directed to an apparatus that simulates physical characteristics of a human child suitable for assessing hazards of products, apparel, or any other objects that might inflict injuries on children.

2. Background of the Invention

Each year, many children suffer from or lose their lives to injuries caused by products, apparel, or other objects. Strangulation, suffocation, and automobile accidents are just a few examples that can cause serious trauma or injuries to children.

To assess hazards or risk of injuries to children, it is necessary to determine exactly how children suffer from the injuries. To analyze the level of injuries in an automobile accident, for example, it is imperative to determine how a force is applied and distributed over the surface of a body during the accident. Also, in order to accurately assess risk of strangulation and suffocation from a product, it is necessary to simulate a breathing or respiration pattern of a child.

A manikin or dummy is often used in a test to assess the level of injuries caused by variety of products to children. During the test, the manikin is exposed to the same condition to which a child would be exposed, and physical effects on the manikin are monitored. To accurately assess the suffocation risk of an object, a child manikin should accurately simulate a breathing or respiration pattern of a child, and the object is placed over the mouth or nose of the manikin to determine air flow resistance caused by the object. Similarly, a test for an injury on a child caused by an automobile accident requires an accurate measurement of the magnitude and location of physical impact on a child manikin as well as the physical effects on the child manikin from the force of the accident.

Conventional apparatuses for monitoring results of trauma or injury to a human, especially a child, may not provide manikin test fixtures that accurately recreate physical features of a child. In particular, there are no adequate child manikins for ages 6 months to 8 years, which are considered to be one of the most at-risk age ranges for personal injury by consumer products, that are accurate in size, weight, and kinematic functions of real children. To date, there is no child-size manikin produced that is versatile and covers wide age ranges. Thus, it is difficult to truly determine how children become entrapped, pinned, or caught in products. The conventional manikins, moreover, are not made of materials the characteristics of which closely resemble those of human flesh, and they may not provide accurate assessment of results of trauma or injury to a child. Consequently, the conventional apparatuses do not accurately reflect actual conditions to which a child is exposed. In the conventional manikin, moreover, it is often difficult to replace a manikin test fixture with another test fixture for conducting a different test.

Therefore, a need exists for an apparatus capable of providing accurate measurement of the results of trauma or injury to a child caused by hazardous conditions. Also, there is a need to design and build a series of manikins that accurately simulate the size, weight, other physical characteristics, and range of possible movement of real children. Such manikins would allow for more comprehensive hazard assessments. Manikins simulating children of different ages allow the hazards specific to these age groups to be evaluated in a quantifiable manner.

SUMMARY OF THE INVENTION

In accordance with the invention, a manikin system is provided. The manikin system includes a trunk portion and a plurality of body portions. The plurality of body portions includes a neck portion detachably connected to the trunk portion, a pair of arm portions detachably connected to the trunk portion, a hand portion detachably connected to each arm portion, a pair of leg portions detachably connected to the trunk portion, and a foot portion detachably connected to each leg portion. At least one of the body portions and trunk portion is formed of a bio-simulating material, and each of the body portions has selected anthropometric characteristics and is removable and replaceable with another body portion having different anthropometric characteristics.

In another aspect, an apparatus is provided for monitoring physical effects of a hazard on a human. The apparatus includes a first anthropometric body portion corresponding to a first body part of the human child, and a second anthropometric body portion pivotally and releasably coupled to the first body portion. The second anthropometric body portion corresponds to a second body part of the human child and has a monitoring portion for monitoring the physical effects of the hazard. The second anthropometric body portion is releasable from the first anthropometric body portion and replaceable with a third anthropometric body portion. At least one of the first, second, and third anthropometric body portions is formed of a bio-simulating material.

In still another aspect, an anthropometric manikin is provided for monitoring physical effects of a hazard on a human child. The manikin includes a head portion anthropometric to a human child head, a trunk portion coupled to the head portion and being anthropometric to a human child torso, a pair of arm portions pivotally and releasably coupled to the trunk portion and being anthropometric to human child arms, and a pair of leg portions pivotally and releasably coupled to the trunk portion and being anthropometric to human child legs. At least one portion of the head portion, the trunk portion, one of the pair of arm portions, and one of the pair of leg portions has a direct contact point for monitoring the physical effects of the hazard. At least one of the portions is formed of a bio-simulating material.

In a further aspect of the invention, a method of making a child manikin head, includes the steps of generating a model of the child manikin head, generating a model of a skull portion, forming a mold for the manikin head from the model of the child manikin head, forming a mold for the skull portion from the model of the skull portion, casting a skull portion formed of a first bio-simulating material with the mold for the skull portion, positioning the skull portion in the mold for the manikin head, and casting the child manikin head formed of a second bio-simulating material in the mold of the manikin head.

Advantages of the invention will be set forth in part in the description that follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the invention and together with the description, serve to explain the principles of the invention.

DESCRIPTION OF THE EMBODIMENTS

Reference will now be made in detail to the exemplary embodiments of the invention, which are illustrated in the accompanying drawings. Wherever possible, the same reference numbers will be used throughout the drawings to designate the same or like parts.

Figure 1:
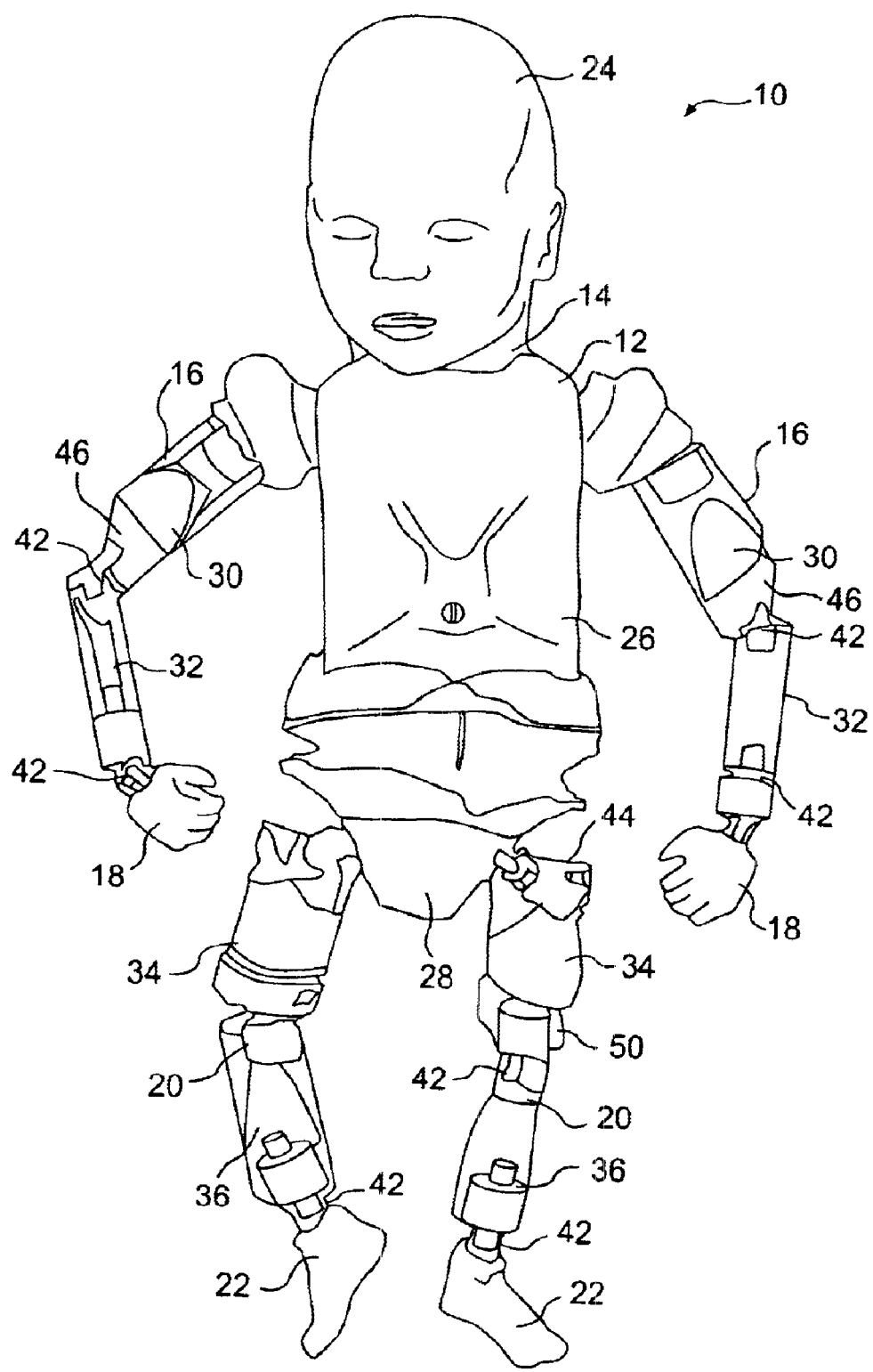
FIG. 1 is a perspective view of an anthoropometric manikin according to one embodiment of the present invention.

According to the invention, a manikin 10 is provided for testing product safety. As illustrated in FIG. 1, the manikin 10 generally includes a trunk portion 12 and a plurality of body portions. The plurality of body portions includes a neck portion 14 detachably connected to the trunk portion 12, a pair of arm portions 16 detachably connected to the trunk portion 12, a hand portion 18 detachably connected to each arm portion 16, a pair of leg portions 20 detachably connected to the trunk portion 12, and a foot portion 22 detachably connected to each leg portion 20. The neck portion 14 may be coupled or attached to a head portion 24. In one exemplary embodiment, the trunk portion 12 may include an upper trunk portion (chest portion) 26 detachably connected to the arm portion 16 and a lower trunk portion (pelvis portion) 28 detachably connected to the leg portions 20. The arm portion 16 may have an upper arm portion 30 detachably connected to the trunk portion 12 and a lower arm portion (forearm portion) 32 detachably connected to the hand portion 18. Each of the leg portions 20 may include an upper leg portion (thigh portion) 34 detachably connected to the lower trunk portion 28 and a lower leg portion 36 detachably connected to the foot portion 22. The manikin 10 may include any other portion that corresponds to a body part of a human.

Each of the body portions or a trunk portion may have selected anthropometric characteristics. The anthropometric characteristic may include dimensions, weight, a range of possible movement (articulation), a material, and any other physical characteristics of body parts of a human, especially a child. As a result, the manikin 10 can accurately simulate the size, weight and other physical characteristics of real children, and each portion of the manikin 10 can simulate the size, weight and articulation of a corresponding body part of a real child. Some examples of the anthropometric characteristics include weight, a stature, a thigh clearance, a buttock-knee length, a knee height, a head circumference, a head length, a head breadth, a head height, a neck circumference, a lateral neck breadth, a clavicale-acromion length, a shoulder breadth, a shoulder-elbow length, an upper arm circumference, an upper arm depth, a radiale-stylion length, a forearm circumference, a forearm breadth, a maximum fist circumference, a maximum first breadth, a maximum first depth, a chest circumference at axilla, a chest breadth at axilla, a waist circumference, a trochanteric height, a calf circumference, a foot length, and a foot breadth.

Furthermore, the body portions or trunk portion may be formed of a bio-simulating material that closely resembles the physical characteristics of human flesh. A suitable bio-simulating material is selected by testing its properties, such as shore hardness and a modulus of elasticity. Shore hardness is a measure of indentation into a plastic of an indenter under load. A modulus of elasticity is a measure of nonpermanent deformation, after which a material returns to its original shape or volume when a deforming force is removed. An example of such a bio-simulating material includes, but not limited to, a mixture of silicone rubber and silicone fluid. Each of the trunk and body portions may be formed by, for example, a molding process and may have a hardware connection, such as a pin, imbedded during casting.

The anthropometric characteristics may include any other features suitable for simulating real human, especially children, and should not be limited to the above examples. One or more of the anthropometric characteristics may be selected to build the manikin 10.

In the embodiment shown in FIG. 1, each of the body portions is removable and replaceable with another body portion having different characteristics. An appropriate combination of body portions and/or a trunk portion may be assembled to form a manikin for a product safety test.

In one exemplary embodiment, the manikin 10 may be made based on a statistical analysis of anthropometric data. For example, sample characteristic measurements of each body part from children were taken and precalculated to obtain the statistically reliable average characteristic measurement of the corresponding body part. The characteristic measurements may be the size, weight, and other physical characteristics of children. Based on the average characteristic measurement of each body part, the anthropometric characteristics for the manikin can be obtained.

Also, by taking the measurements for certain areas of the body, a matrix can be built to determine the optimum size for body parts to allow for the most extensive coverage with a minimum number of manikins. For example, the measurements for the construction of the manikin 10 may be obtained from the Human Scale (MIT Press) books on anthropometric measurements and the Anthropometry of Infants, Children, and Youths to Age 18 for Product Safety Design, by Michigan University, Ann Arbor—Highway Safety Research Institute.

Figure 2:
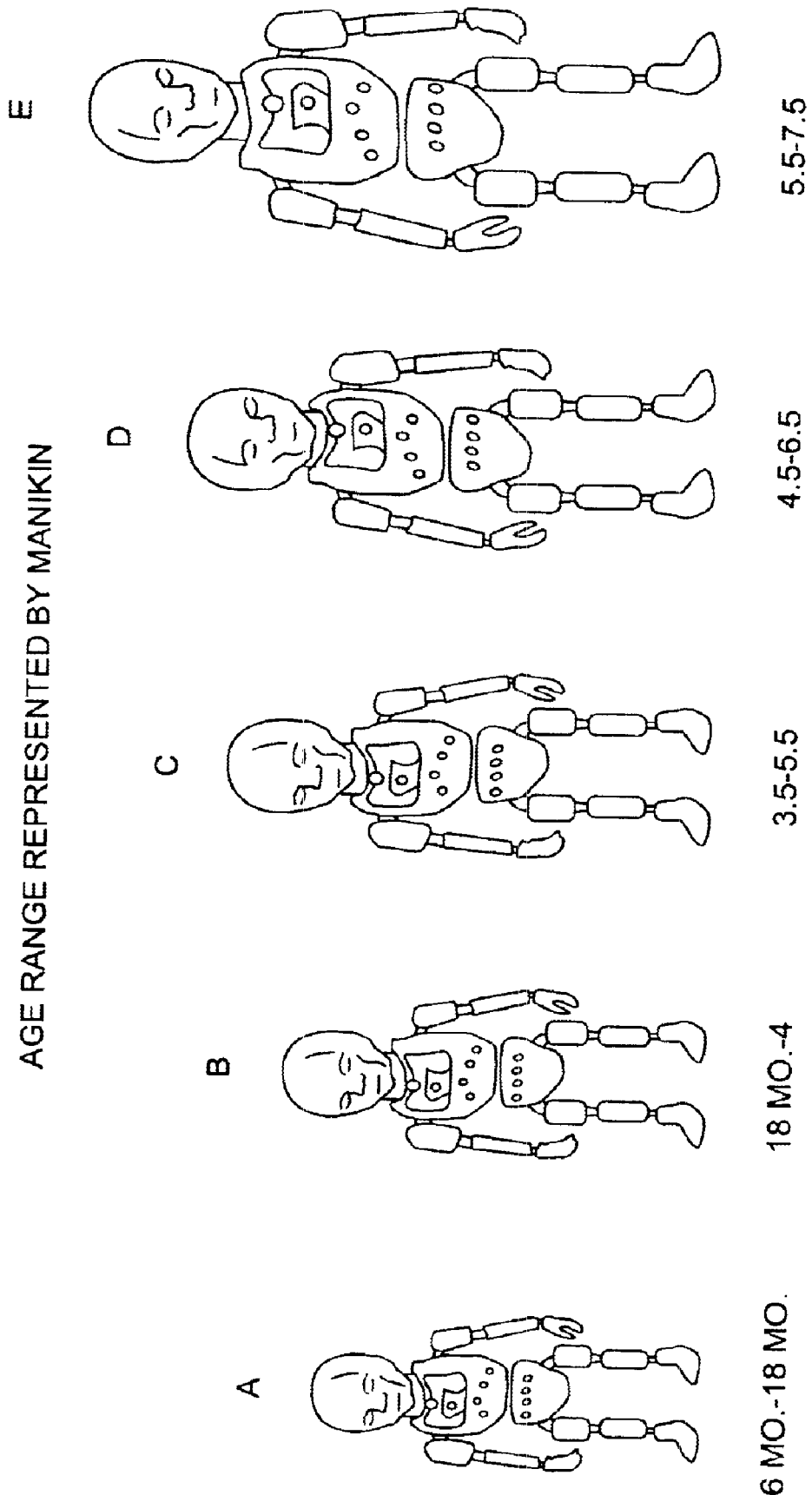
FIG. 2 is a graphical chart illustrating percentage of age represented by manikins according to exemplary embodiments of the present invention.

FIG. 2 shows system of the manikins 10 covering the age range from 6 months to 8 years. Based on the statistical analysis of anthropometric data, a broadest range of representation with a smallest number of manikins is determined. As shown in FIG. 2, the manikins 10 may be divided into five different sizes through the statistical analysis of anthropometric data on children. For example, manikin A represents a child between the age of 6 and 18 months, manikin B the age of 18 months and 4 years, manikin C the age of 3.5 and 5.5 years, manikin D the age of 4.5 and 6.5 years, and manikin E the age of 5.5 and 7.5 years.

Figure 3:
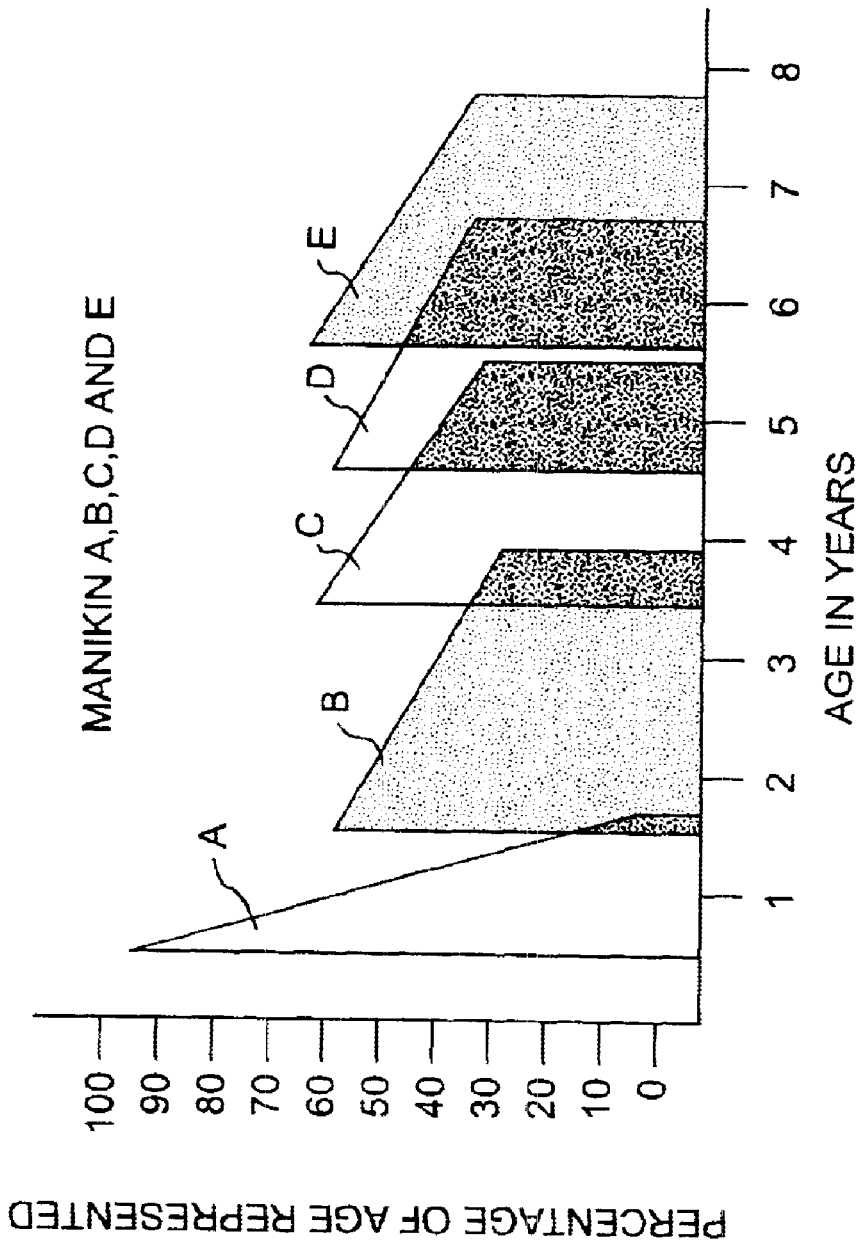
FIG. 3 is a perspective view of manikins representing various age ranges.

FIG. 3 is a chart illustrating percentage of age represented by manikins A–E. As shown in FIG. 3, each manikin represents a certain percentage from different age groups of children. Some overlapped sections in the chart indicate where manikins overlap is sizes.

Figure 4:
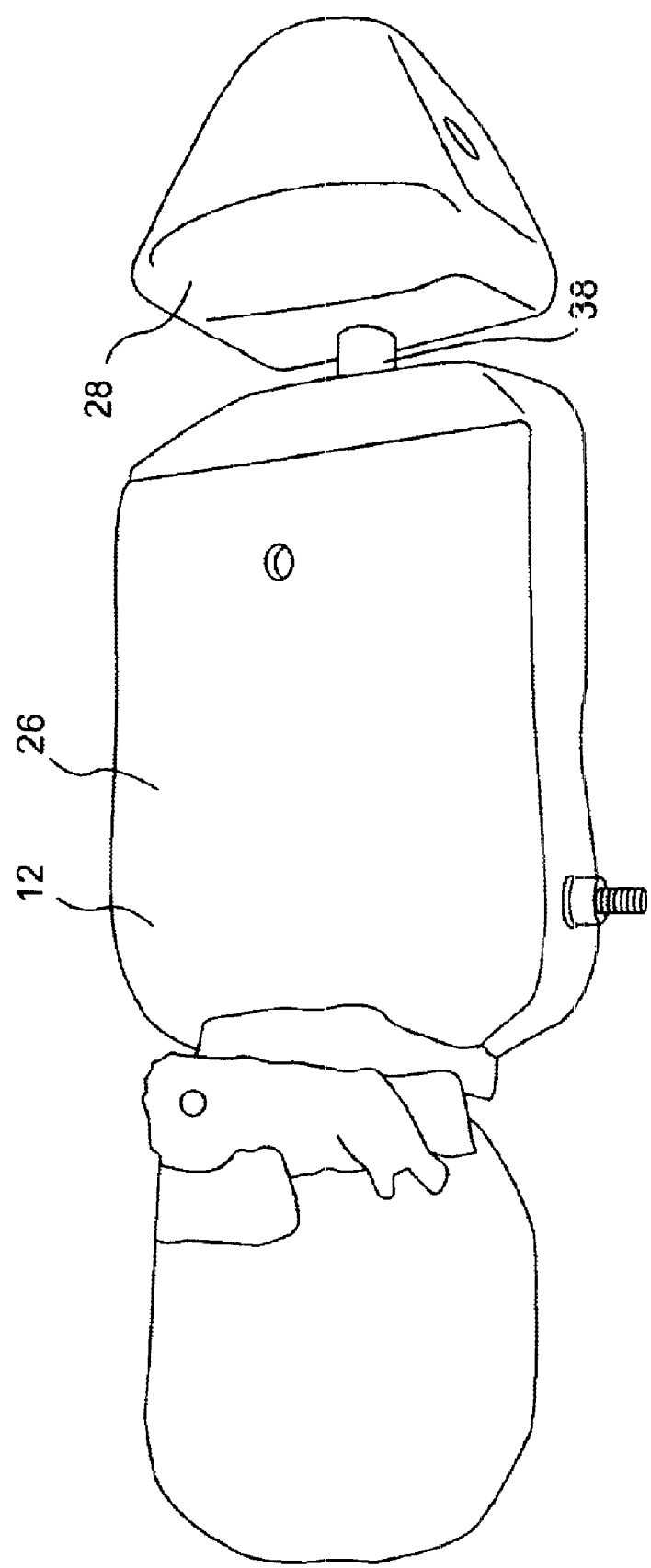
FIG. 4 is a partial perspective view of a manikin according to another embodiment of the invention.

In the embodiment shown in FIG. 4, the trunk portion 12 of the manikin 10 may include the upper and lower trunk portions 26, 28 made of polyurethane. The upper and lower trunk portions 26, 28 may include weights (not shown), such as lead shots, to have an appropriate weight. The upper trunk portion 26 may be connected to the lower trunk portion 28 by a spring 38 to allow the manikin 10 to bend at the waist. The spring 38 may be disposed at the location of the spine of a child. During a seating test, the manikin 10 may be bend up to 90 degrees at the waist to simulate a seating position of a child.

In another embodiment, the upper and lower trunk portions 26, 28 may be made of vacuum-formed shells. The trunk portions 26, 28 may include lead disks (not shown) so that the trunk portions 26, 28 has an appropriate weight for the simulated child. In this embodiment, the upper and lower trunk portions 26, 28 are connected by a universal joint to allow one portion to bend with respect to the other. Wires may be provided between the upper and lower trunk portions 26, 28

Figure 5:
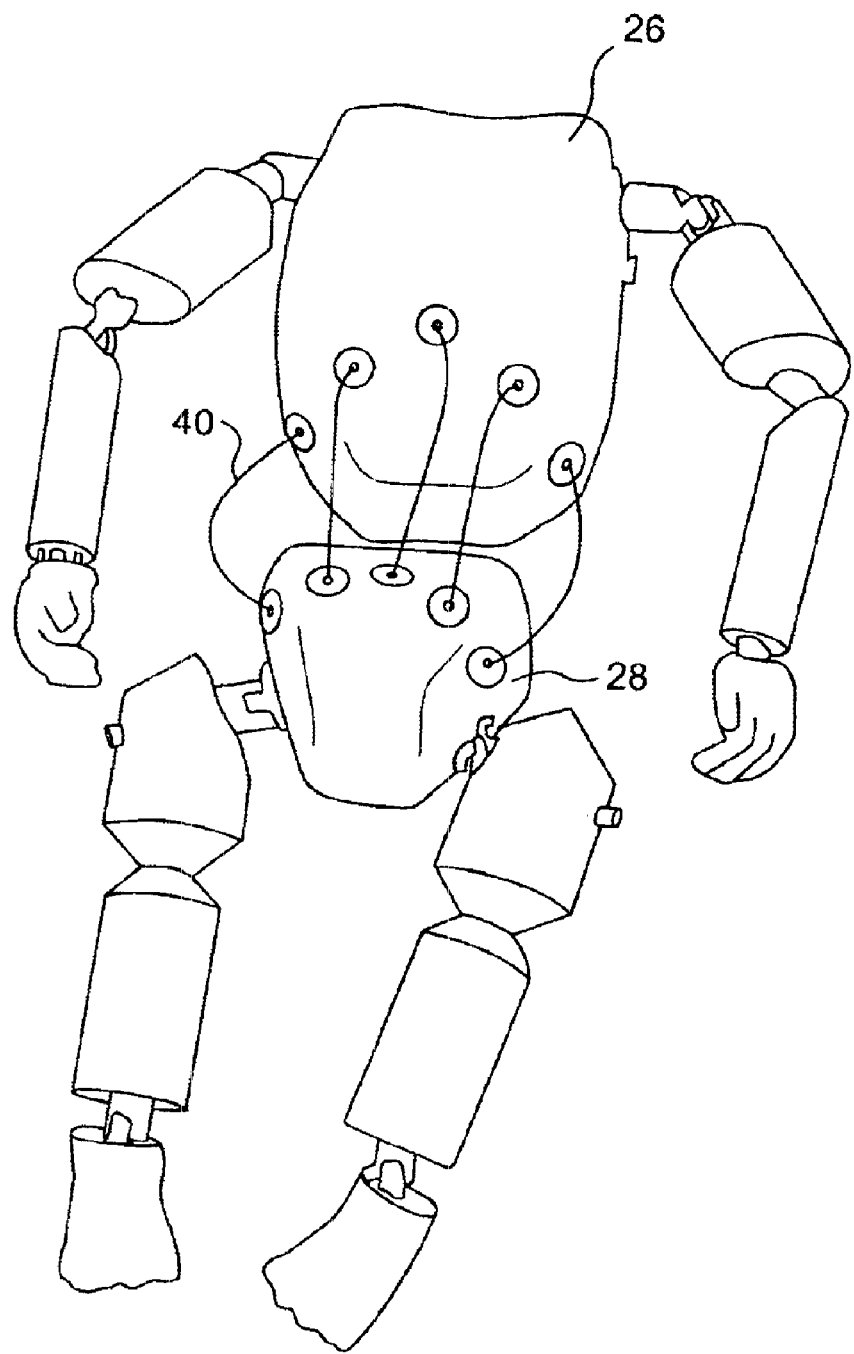
FIG. 5 is a partial perspective view of the manikin shown in FIG. 1.

As shown in FIG. 5, the upper trunk portion 26 may have a tapered section so that the upper trunk portion 26 can bend with respect to the lower trunk portion 28. To form an exoskeleton over the tapered section, wires 40 may be provided to connect the upper and lower trunk portions 26, 28. The wires 40 can define the stomach area of the manikin 10, limit the movement of the manikin 10 to a proper range, and contain a plush belly (not shown) of the manikin 10.

The neck portion 14 and the head portion 24 of the manikin 10 is properly weighted. The head portion 24 may include a jaw or the mandible that may be hinged to the head portion for proper movement. The head portion 24 may be attached to the neck portion 14 by a spine spring (not shown) so that the head portion 24 can tilt with respect to the neck portion 14. Tubes may be provided in the neck portion 14 or the head portion to simulate an air passage, such as oropharynx, nasophrynx, and trachea, and blood vessels, such as a carolid artery. The manikin 10 with the above-described neck and head portions 14, 24 may be coupled to an apparatus for measuring strangulation effects, as disclosed in U.S. Pat. No. 6,230,574, an apparatus for simulating and monitoring a respiration pattern of a child.

Figure 6:
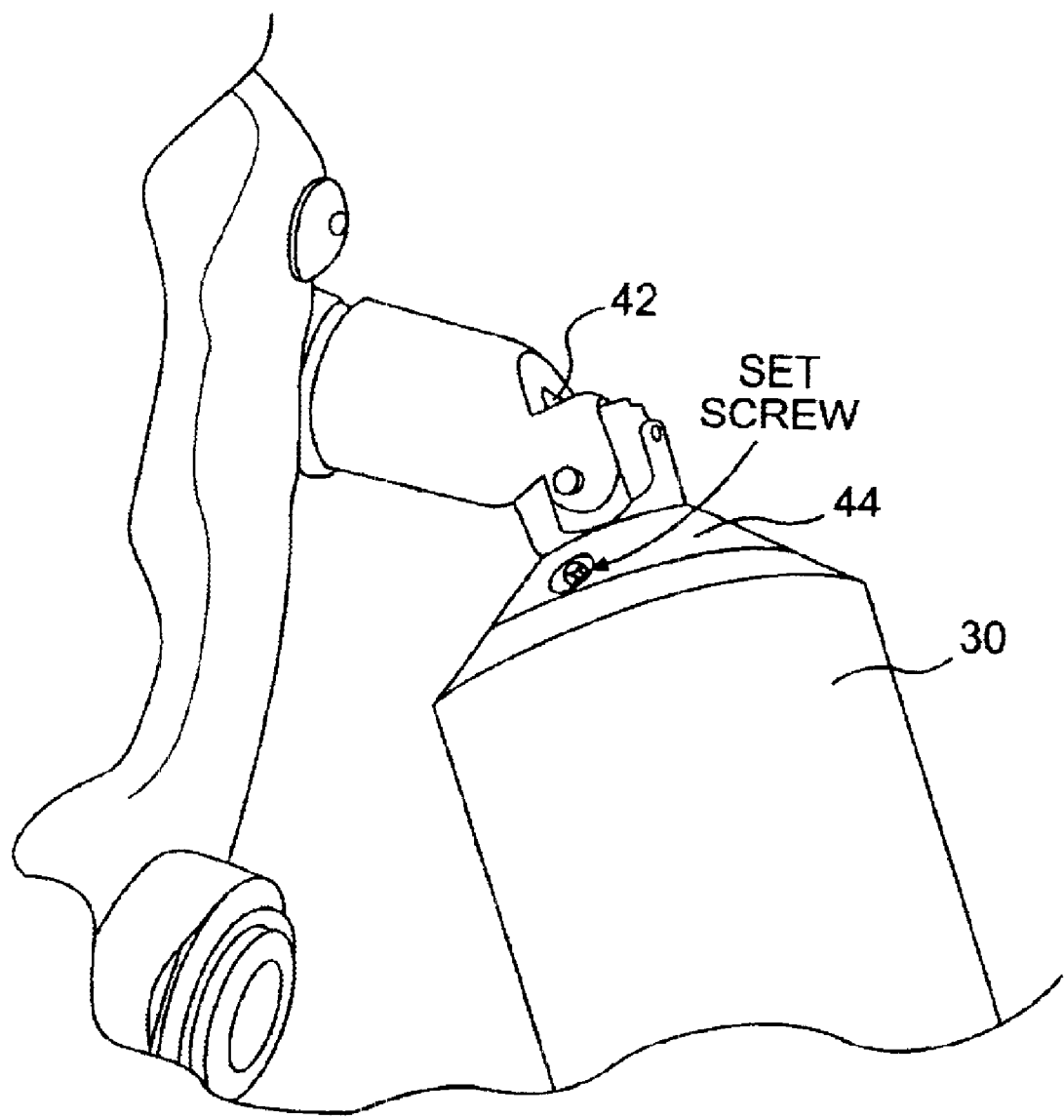
FIG. 6 is a partial perspective view of a connection between trunk and arms portions of the manikin shown in FIG. 1.

The arm portions 16 of the manikin 10 may be built with dimensions determined from the statistical analysis. In the embodiment shown in FIG. 1, the forearm portion 32 is cut on one end with a 45-degree angle to simulate an elbow bend. A hole is drilled to both ends of the forearm portion 32 to receive joint members 42, such as a universal joint, to provide an appropriate range of motions. The ends of the upper arm portion 30 may be tapered to provide a desired range of a shoulder or elbow movement. As shown in FIG. 6, the upper arm portion 30 may have a tapered section 44 at one end to simulate a desired shoulder movement and another tapered section 46 to simulate a desired elbow movement. In the embodiment shown in FIG. 6, the tapered section 44 has a surface cut at 45-degree angle. The tapered section 46 may have a surface cut at 45-degree on one side and another surface cut at 56 degree on another side. The joint members 42 are attached to both ends of the upper arm portions 30. The joint member 42 attaching the upper arm portion 30 with the upper trunk 12 may be an universal joint, and the joint member 42 attaching the upper and lower arm 30, 32 may be a hinge. Any other joint member to provide a suitable movement of the body portions can be used.

Figure 7:
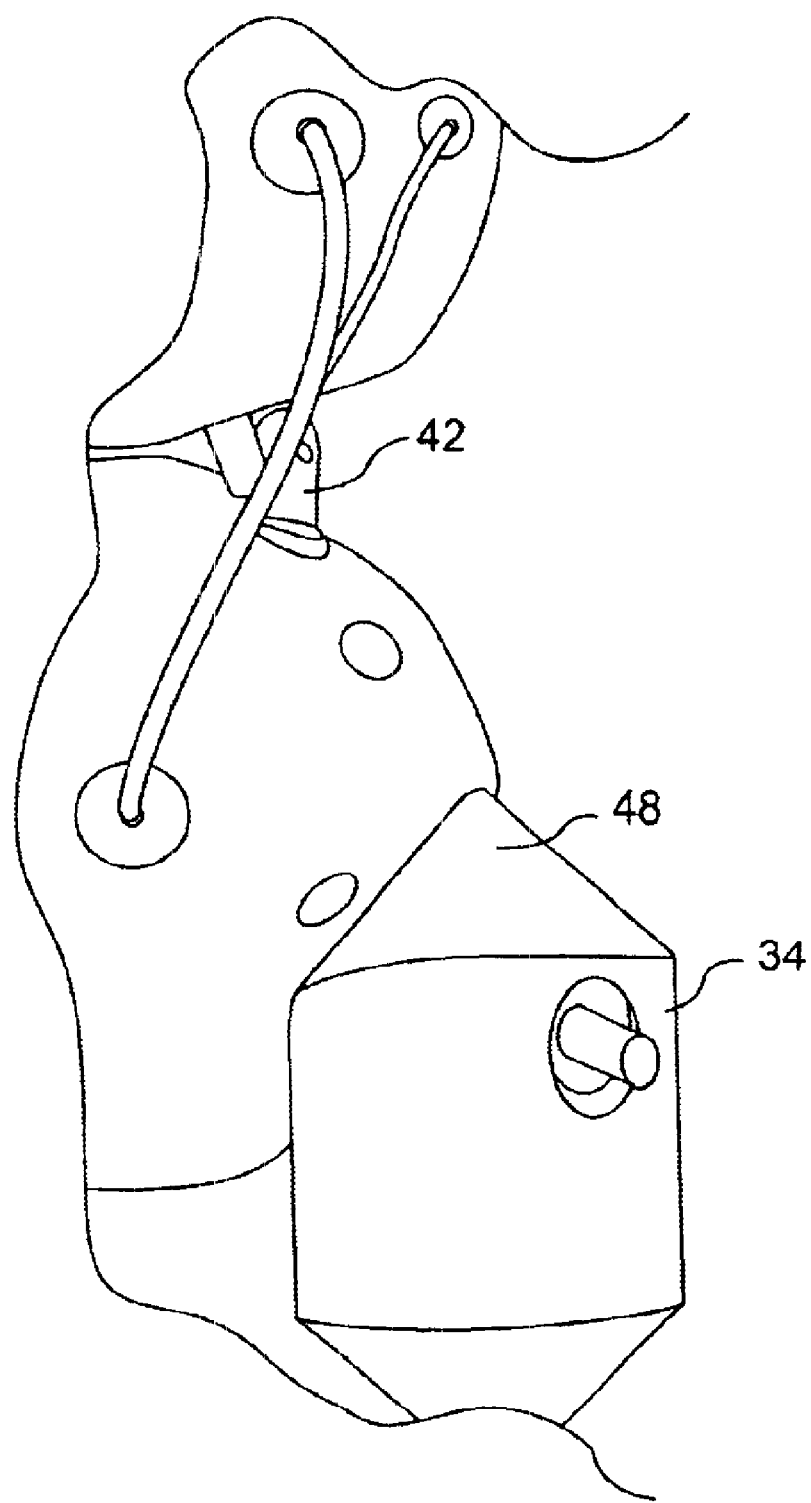
FIG. 7 is a partial perspective view of a connection between trunk and leg portions of the manikin shown in FIG. 1

The leg portions 20 may be build according to the measurements obtained from the statistical data. The leg portions 20 provide an appropriate range of movement by a real leg of a child. One end 48 of the upper leg portion 34 is cut at an angle so that the leg portion 20 can move with respect to the lower trunk portion 28. As shown in FIG. 7, the end 48 of the upper leg portion 34 is cut at 45-degree angle and has a joint member 42, such as a universal joint. The other end 50 of the upper leg portion 34 may also have a tapered surface at a certain angle to simulate an appropriate knee movement. The lower leg portion 36 has a tapered surface cut at a certain angle to provide the desired knee movement and has joint members, such as a hinge or universal joint 42 at both ends.

In another embodiment, the manikin 10 may also include at least one sensor removably inserted in one or more of the plurality of body portions or the trunk portion. The manikin 10 may accommodate a vast array of different sensors, such as a suffocation, strangulation, impact, pressure, a suffocation, strangulation, impact, and elevated temperature senor and elevated temperature sensor. The sensor may be placed over a monitoring portion at one or more of the plurality of body portions or the trunk portion for monitoring physical effects on the manikin. To measure an effect of strangulation on a child, for example, a strangulation sensor disclosed in U.S. Pat. No. 6,230,574 may be implemented in the neck portion 14 or any other suitable body portions. Furthermore, a sensor, such as a pressure sensitive film, capable of measuring a pressure distribution from any type of force, including applied static or kinetic forces, may be placed at direct contact point at one or more of the plurality of body portions or the trunk portion to analyze an impact or static force on a child. Through the analysis, an area of contact (monitoring portion), a total applied force, an average pressure, a maximum pressure, and an area of each pressure range may be determined and adjusted.

Figure 8:
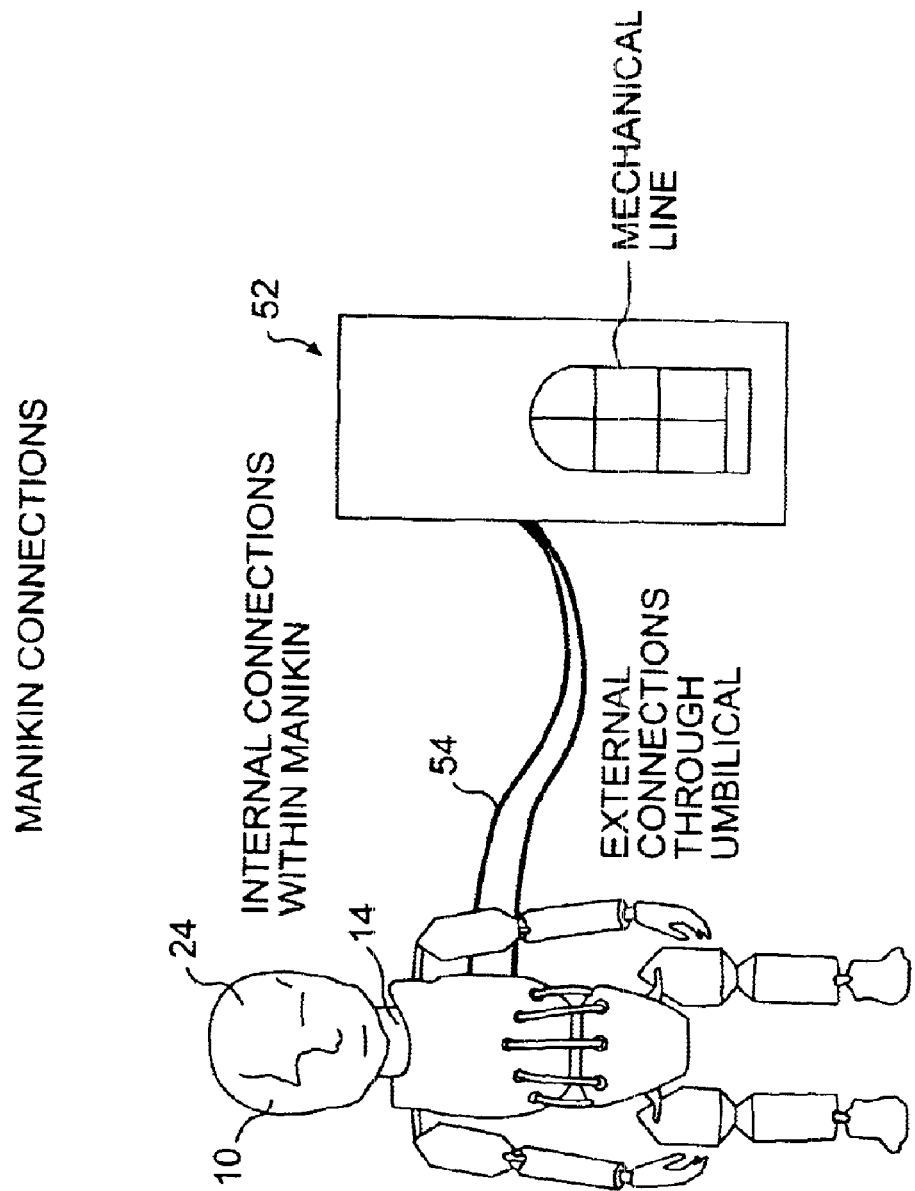
FIG. 8 is a perspective view of the manikin shown in FIG. 1 coupled to an apparatus for simulating and monitoring a respiration pattern according to one embodiment of the invention.

As shown in FIG. 8, the manikin 10 may be coupled to a mechanical lung apparatus 52 to simulate and monitor a respiration pattern of a child. In the embodiment, air conduits 54 connect the manikin 10 and the apparatus 52. Also, a sensor (not shown in FIG. 8), such as a pressure transducer, for monitoring a respiration pattern of a child may be coupled to the head or neck portion 24, 14 of the manikin 10.

Each of the trunk portion 12 and body portions is removable and replaceable with another body portion having different characteristics. Thus, one may easily change a body or trunk portion having a sensor or connector for monitoring one physical effect of a hazard on a child with another body or trunk portion having a different sensor or connector for monitoring a physical effect of a different hazard on a child, thereby providing flexibility to change portions (test fixtures) of the manikin 10 easily during various tests. This may allow the manikin 10 to be equipped with different sensors for another project without major redesigns. Also, all the sensors need not be attached to the manikin 10 at once, thereby maintaining proper weighting and movement.

Figure 9:
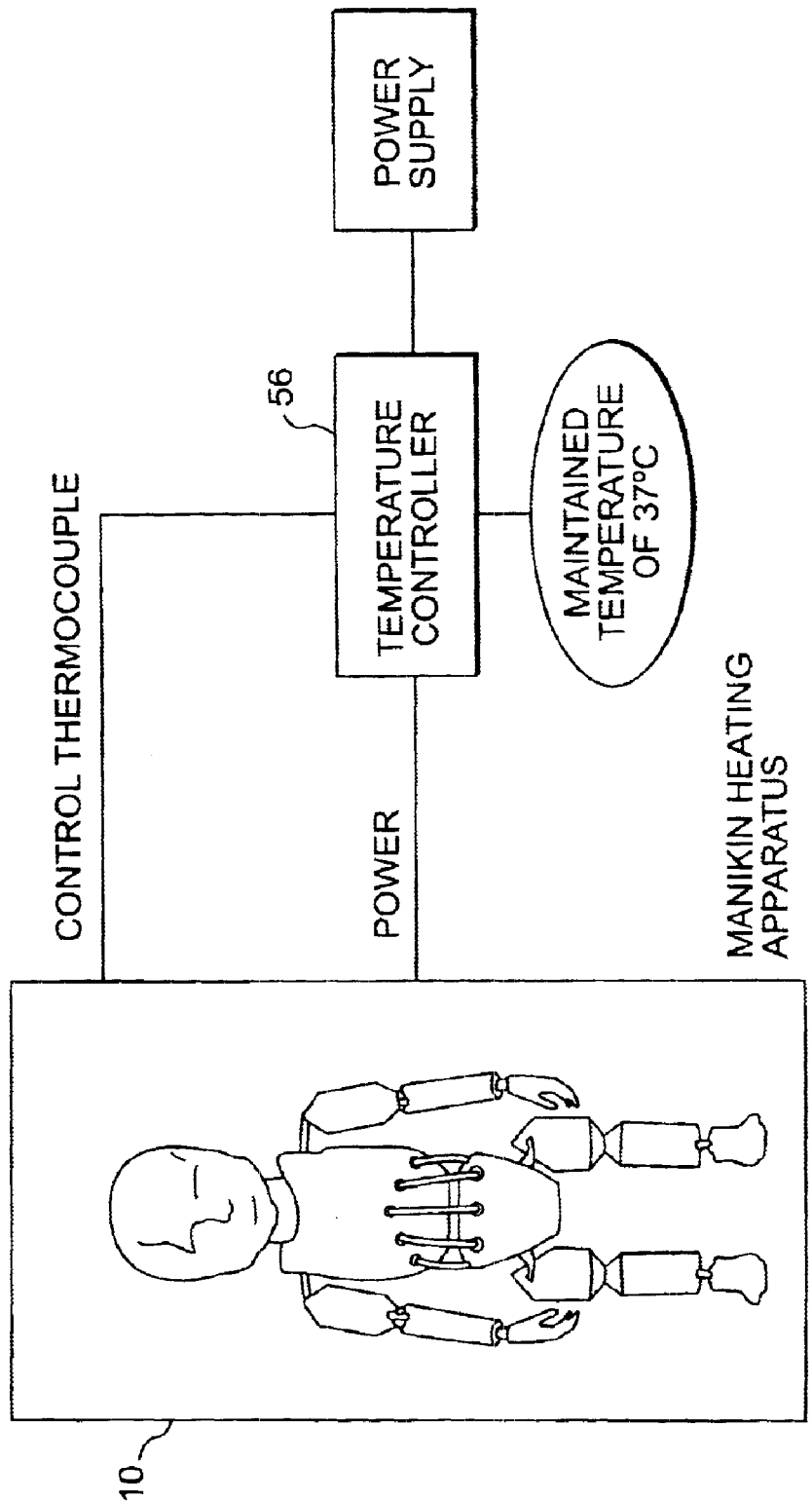
FIG. 9 is a perspective view of the manikin shown in FIG. 1 coupled to a thermal controller according to one embodiment of the invention.

In another embodiment as illustrated in FIG. 9, the manikin 10 may be coupled to a thermal controller 56 to maintain an appropriate body temperature (about 37 degree Celsius) of the manikin 10 if so desired. The thermal controller 56 may monitor the temperature of the manikin 10 by a thermocouple and provide heat power to the manikin 10.

In another embodiment, the apparatus or anthropometric manikin 10 is provided for monitoring physical effects of a hazard on a human. The apparatus 10 includes a first anthropometric body portion corresponding to a first body part of the human child and a second anthropometric body portion pivotally and releasably coupled to the first body portion. The second anthropometric body portion corresponds to a second body part of the human child and has a monitoring portion for monitoring the physiological effects. The second anthropometric body portion is releasable from the first anthropometric body portion and replaceable with a third anthropometric body portion. At least one of the first, second, and third anthropometric body portions is formed of a bio-simulating material.

In another embodiment, an anthropometric manikin 10 is provided for monitoring physical effects of a hazard on a human. The manikin includes a head portion 24 anthropometric to a human child head, a trunk portion 12 coupled to the head portion 24 and being anthropometric to a human child torso, a pair of arm portions 16 pivotally and releasably coupled to the trunk portion 12 and being anthropometric to human child arms, and a pair of leg portions 20 pivotally and releasably coupled to the trunk portion 14 and being anthropometric to human child legs. At least one portion of the head portion 24, the trunk portion 12, one of the pair of arm portions 14, and one of the pair of leg portions 20 has a monitoring portion for monitoring the physical effects, and at least one of the portions is formed of a bio-simulating material.

In another embodiment, a method of making a child manikin head is provided. The construction of the head portion 24 is described in detail below. Although only the construction of the head portion 24 is described here, the described method is also generally applicable to other body portions of the manikin. It is essential to design a body portion that closely simulates the physical characteristics and properties of the respective body portion of a human child. The manikin 10 should be able to accurately simulate the response of a human child to the application of a force of a variety of magnitude and orientation.

In order to construct the head portion 24, for example, the physical properties of a child head is studied. Various measurements and calculations were made to determine the physical characteristics and properties of a human head. As disclosed in U.S. Pat. No. 6,230,574, based on extensive research, the modulus of elasticity for the various parts of the human neck were calculated to be as follows: Jugular Veins=18 psi; Carotid Artery=32 psi; Cervical Vertebrae (spine)=50,000 psi; Trachea=2200 psi; Muscle Tissue= 18–25 psi; Fat Tissue=less than 18 psi; and Esophagus=6 psi. Based on these values, the appropriate materials can be selected for each of the body portions and the trunk portion.

Figure 10:
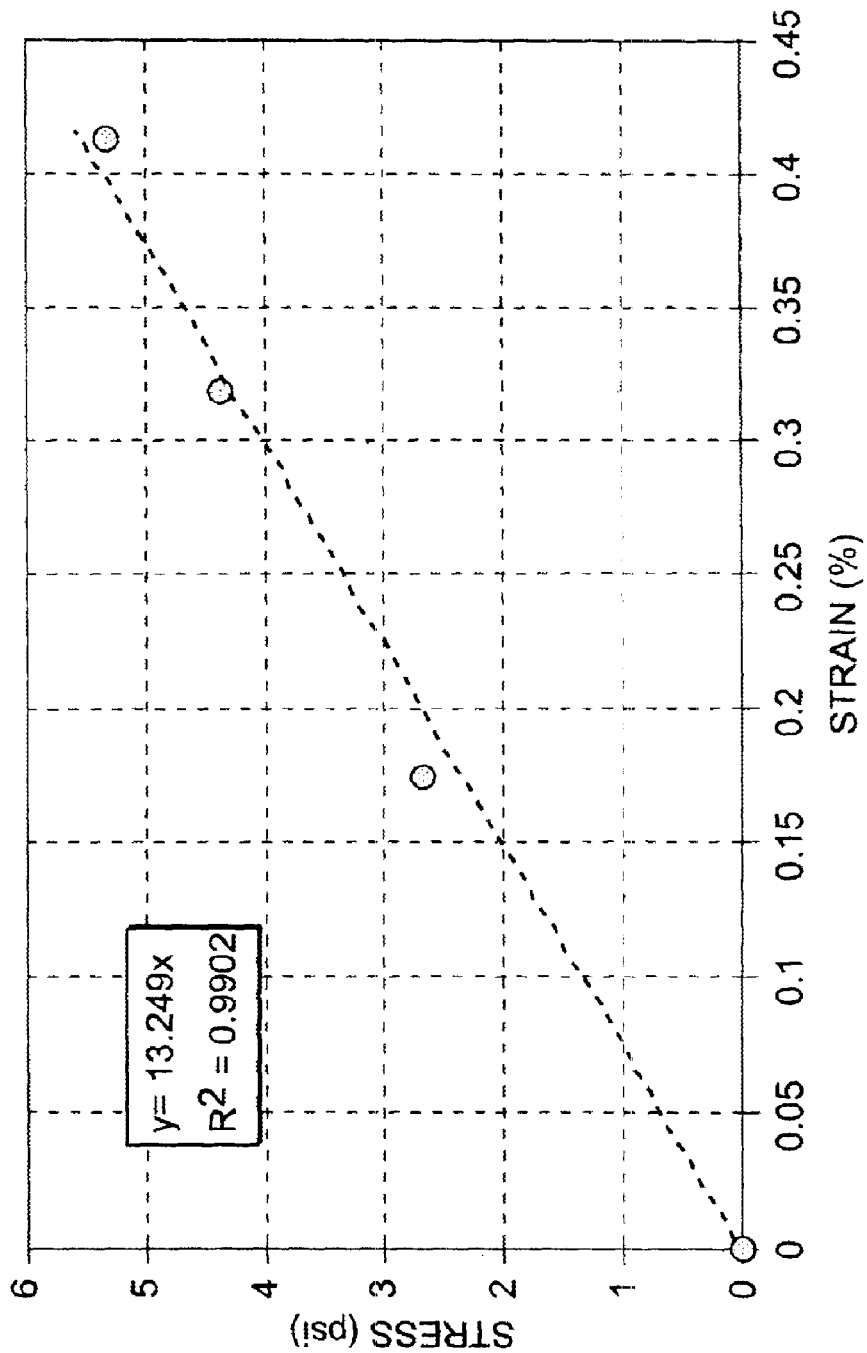
FIG. 10 is a graph of stress in pound per square inch versus strain of Walco Vi-Sil 1068 diluted with 30% Shin-Etsu V-50.

It is also necessary to determine the physical characteristics of a human flesh, including a skin, to provide a bio-simulating material suitable for human flesh. Human flesh is considered to have a shore A hardness value of zero. Based on a research, a modulus of elasticity of human flesh is approximated to be around 3–15 psi. After testing a variety of materials, it was decided that a mixture of Walco Vi-Sil 1068 silicone rubber diluted with 30% total weight of Shin-Etsu V-50 silicone fluid formed the proper shore hardness and modulus of elasticity for simulating human flesh. FIG. 10 is a graph illustrating the relationship between averaged stress and strain of Walco Vi-Sil 1068 diluted with 30% total weight of Shin-Etsu V-50 silicone fluid. Several samples of the material were tested, and the average values of stress and strain were obtained. The graph was obtained by approximation based on the average value of stress and strain of the material. The slope of the graph, which has the value of 13.249, represents the modulus of elasticity of the material. This material is only one example of materials that are suitable for simulating human flesh, and other materials having similar properties may be acceptable alternatives to Walco Vi-Sil 1068 diluted with 30% total weight of Shin-Etsu V-50 silicone fluid.

Figure 11:
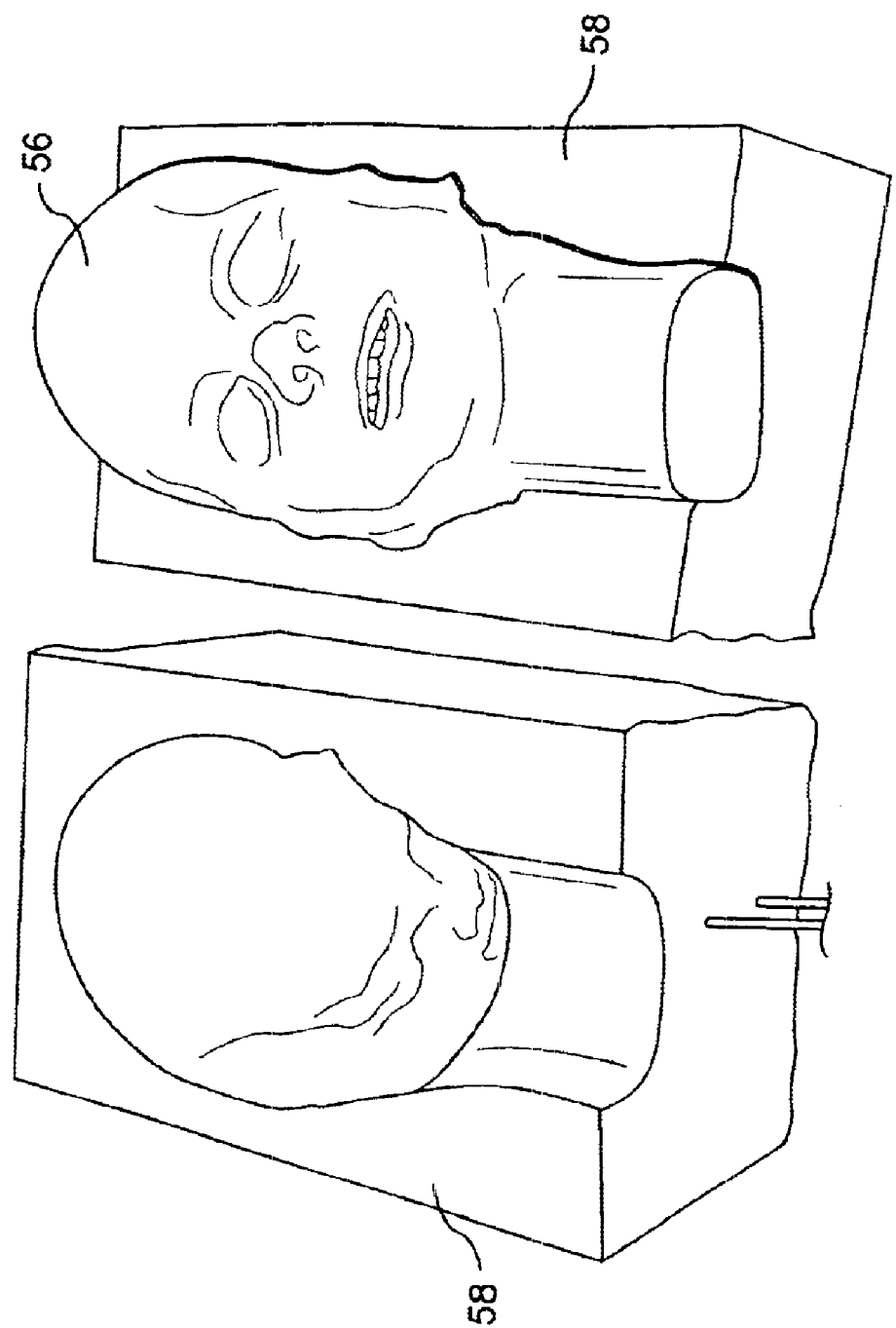
FIG. 11 is a perspective view of a model of the manikin head in a mold for the manikin head.

A CT scan of a child head was taken to determine the skeletal structure and tissue of the head. The scan was then converted into a stereolithography file to provide a three-dimensional image of a child head. Based on the stereolithography file; a three-dimensional model of a child head is made of an epoxy resin. The model may be smoothened to provide a consistent test surface. The model may also be modified by removing the shoulders and extending the neck to provide a cavity for a neck portion in a mold. As shown in FIG. 11, using the model 56, a mold 58 for a child head is manufactured. The mold 58 may be separated into two halves for ease of casting.

Figure 12:
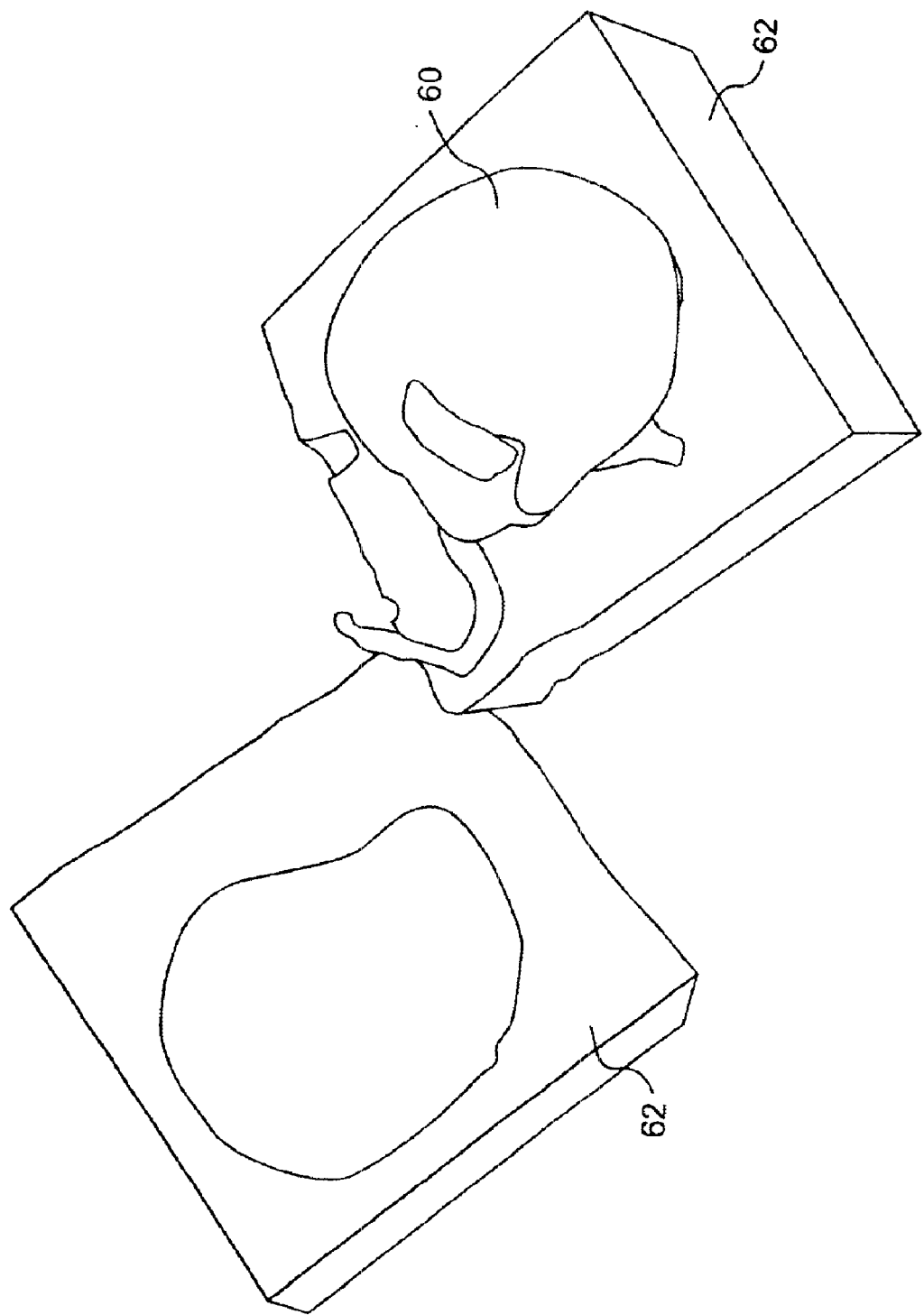
FIG. 12 is a perspective view of a skull portion cast in a mold for the skull.
Figure 13:
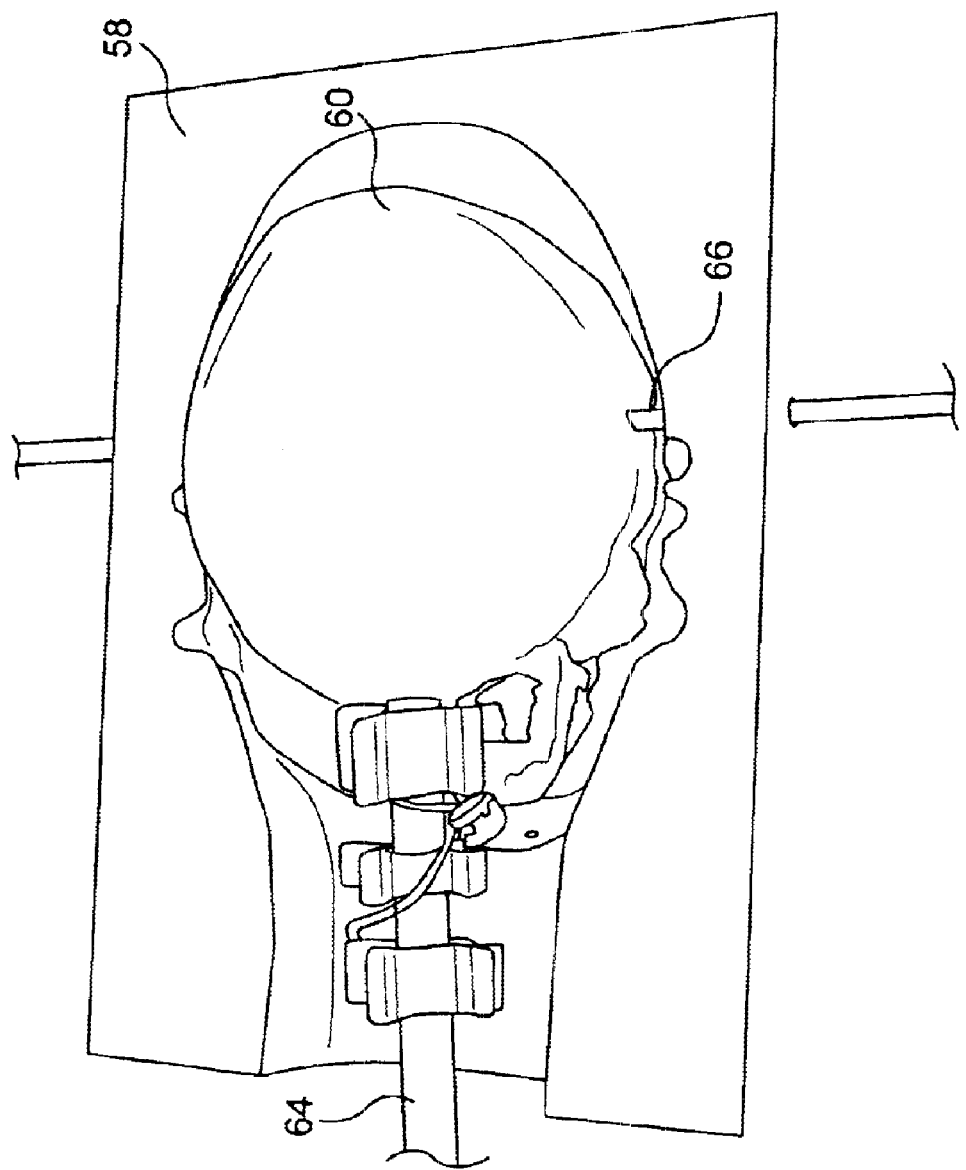
FIG. 13 is a perspective view of the skull portion with body part portions and a sensor placed in the mold for the manikin head.
Figure 14:
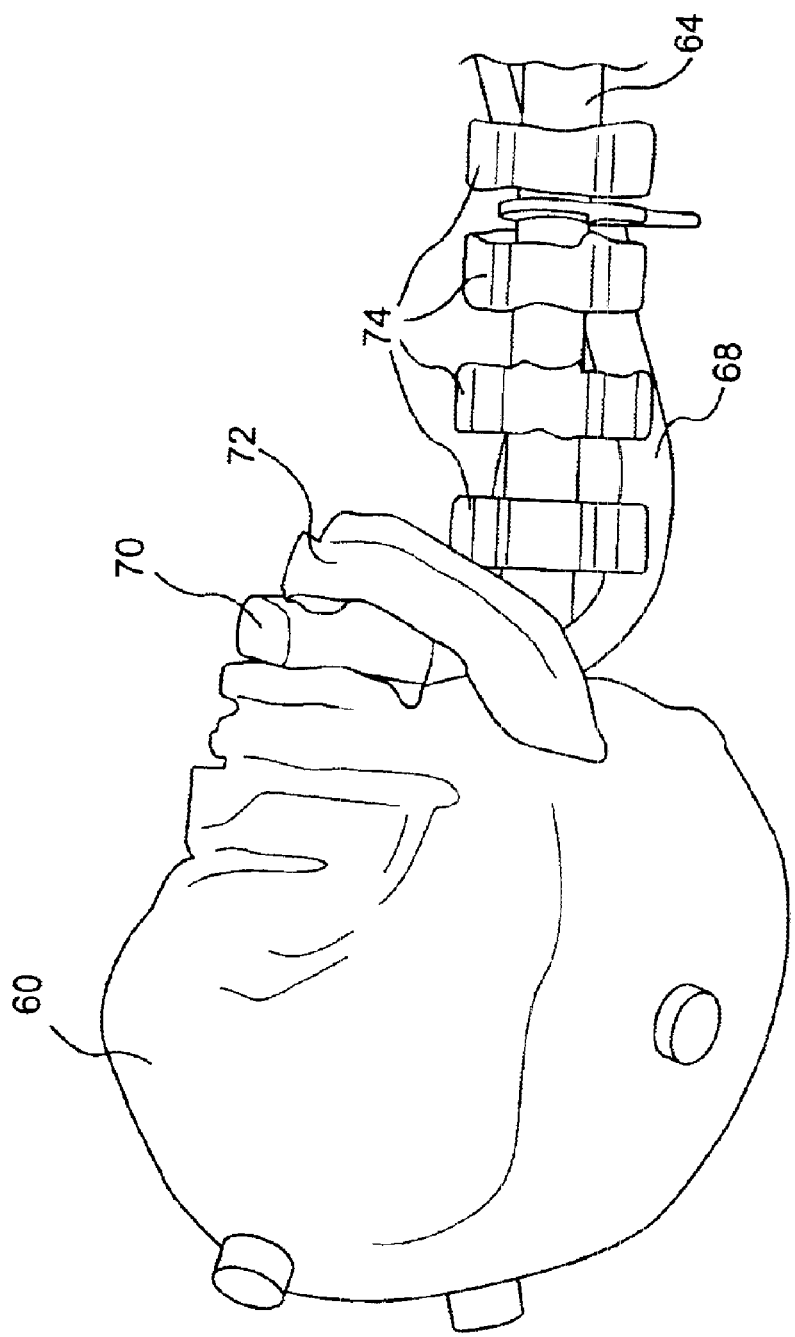
FIG. 14 is a perspective view of the skull portion with the body part portions and the sensor.

A mold for a skull is also made in a similar manner. As shown in FIG. 12, a skull 60 is then cast with a suitable bio-simulated material based on the mold 62 for the skull. The bio-simulated skull may be cast as a solid so that the skull may be adjusted to simulate a desirable weight of the brain. The bio-simulated skull may be drilled to provide the nasal cavity and to allow insertion of airway tubes and mounting posts. A mounting hole is drilled and tapped at the point where the skull meets the spinal column. In FIG. 13, a spinal column mounting post 64 is fitted in the skull 60. Additional mounting holes may be drilled and mounting pins or spacers 66 are inserted into the mold for the child head to accurately mount the skull in the mold for the child head.

Figure 15:
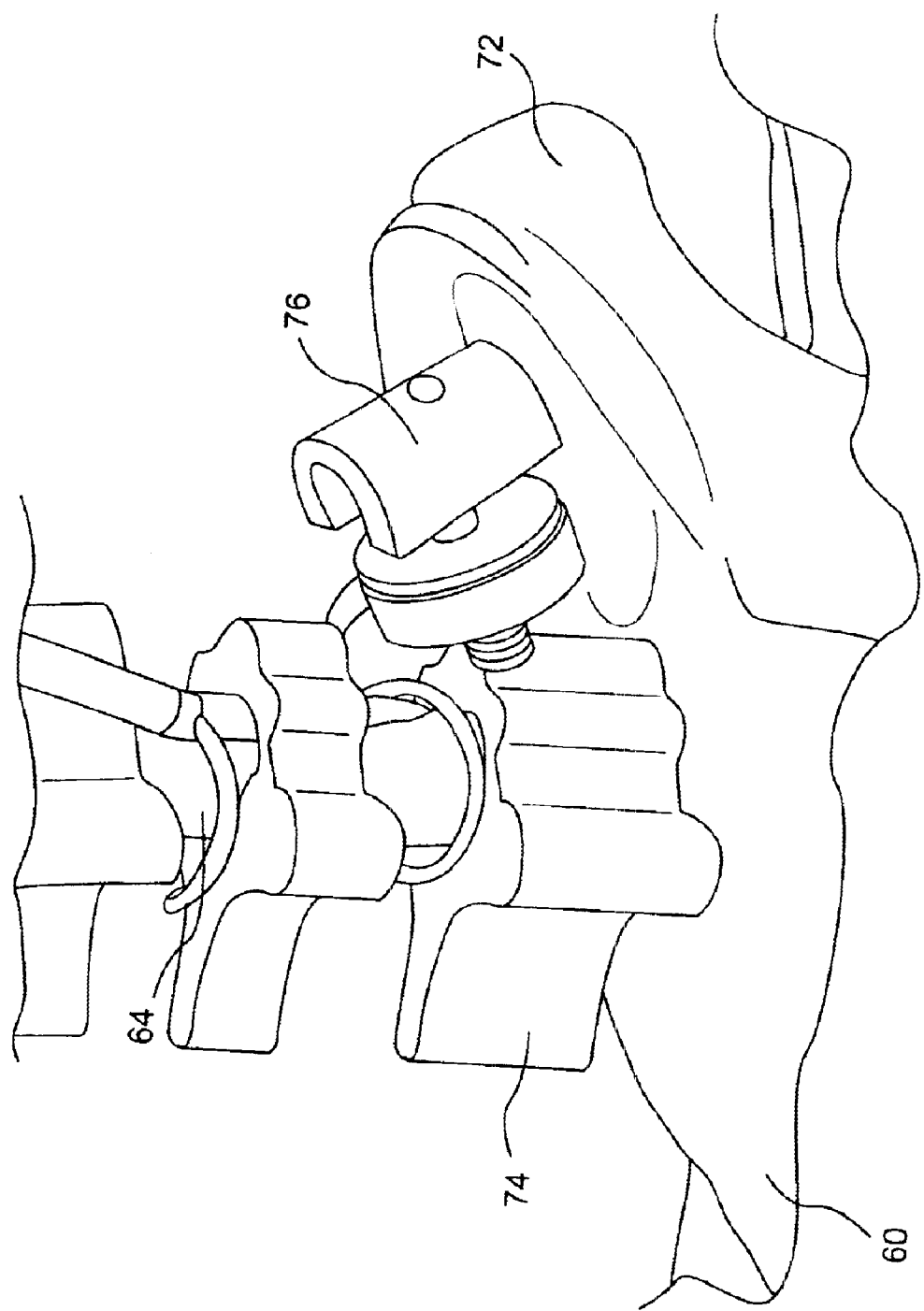
FIG. 15 is a perspective view of a load-type strangulation sensor placed at the skull portion.

Before the skull 60 is mounted in the mold 58 for casting, additional components to simulate the actual child head and a device to measure the physical effects of a hazard on the child head may be fixed to the skull 60. As shown in FIG. 15, such components and device include airway tubes 68, an oral cavity spacer 70, mandible 72, and a sensor (not shown in FIG. 15). Bio-simulated vertebrae 74 may also be fitted along the spinal column mounting post 64 to provide a bio-simulated spinal column after the mounting post is removed from the skull 60. The oral cavity spacer 70 and the mandible 72 may be hot glued into place. The oral cavity spacer 70 provides the accurate positioning of the mandible with respect to the skull 60, and it is removed when casting is complete. An oral airway tube may be connected to the oral spacer, and nasal airway tubes may also be fitted into an appropriate position. The tubes are formed from a suitable material, such as flexible vinyl tubing.

In one embodiment shown in FIG. 15, a strangulation sensor 76 may be installed. The strangulation sensor 76 may be a load sensor that measures the load applied to the critical point. Based on the extensive research, one suitable position for the load sensor is at the first vertebra 74 in a 30° orientation from the spine 64, as illustrated in FIG. 15. Other types of strangulation sensors, such as an air pressure sensor, a liquid pressure sensor, and a bend sensor, may be used at an appropriate location for measurement.

In one exemplary embodiment, the bio-simulating material for the human flesh may be made by mixing Walco Vi-Sil 1068 at a ratio of 10:1 resin to catalyst. After the resin and catalyst is mixed, the Shin-Etsu V-50 silicone diluent is added at 30% of the total weight. The diluent is mixed into the silicone resin, and then the mixture is placed in a vacuum chamber and exposed to the pressure of 21 inch. of Hg until air trapped in the mixture is removed.

After all the desired components and devices are installed in the skull, the skull is placed in one of the mold halves 58 as shown in FIG. 13. Then the mold halves are closed and the bio-simulating material prepared for the human flesh is poured in the mold for casting. It may take 24 hours at 70° F. for the silicone to catalyze. After the silicone catalyzes and provides a suitable bio-simulating material for the human flesh, the head portion 24 is removed from the mold 58.

Accordingly, the manikin 10 and the method of making the same can provide accurate measurement of physical effects of hazardous conditions on a child and accurately simulate the size, weight, other physical characteristics, and range of possible movement of real children.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a child manikin head, including the steps of:

generating a model of the child manikin head;

generating a model of a skull portion;

forming a mold for the manikin head from the model of the child manikin head;

forming a mold for the skull portion from the model of the skull portion;

positioning the skull portion in the mold for the head portion;

casting a skull portion with a first bio-simulating material in the mold for the skull portion;

casting the child manikin head with a second bio-simulating material in the mold for the child manikin head; and forming tubes in the head portion to simulate oropharynx and nasopharynx air passages for use in measuring and monitoring respiration patterns.

2. The method of claim 1, wherein the first bio-simulating material provides physical characteristics of a child skull and the second bio-simulating material provides physical characteristics of human flesh.

3. The method of claim 1, wherein the second bio-simulating material has a shore hardness value of zero and a modulus of elasticity in a range between 3 to 15 pounds per square inch (psi).

4. The method of claim 3, wherein the second bio-simulating material is formed of a mixture of silicone rubber and silicone fluid.

5. The method of claim 1, further including the step of mounting a body part portion of the skull portion.

6. The method of claim 4, wherein the body part portion includes an airway tube and a mandible portion.

7. The method of claim 1, further including the step of mounting a sensor selected from a group consisting of a strangulation sensor, a suffocation sensor, and an elevated heat sensor.

8. The method of claim 7, wherein the sensor is a load sensor for measuring effect of strangulation on a human.

9. A method of forming a manikin, comprising:

forming a skull portion of a first bio-simulating material;

forming a head formed of a second bio-simulating material which is formed from a mixture of silicone rubber and silicone fluid;

forming a neck portion connected to the head; and providing at least one sensor selected from a group consisting of a suffocation sensor and a strangulation sensor removably mounted to the head portion or neck portion.

10. The method of forming a manikin of claim 9, further comprising forming tubes in the head portion or neck portion to simulate oropharynx and nasopharynx air passages, wherein at least the suffocation sensor or the strangulation sensor measures and monitors respiration patterns.

* * * * *